United States Patent
Wang et al.

(10) Patent No.: US 6,783,139 B1
(45) Date of Patent: Aug. 31, 2004

(54) BICYCLE HAVING DUAL-PURPOSE PEDAL

(76) Inventors: Chien-Kuo Wang, 7F, No. 40, Lane 468, Min An W Rd., Hsinchuang City, Taipei Hsien (TW); Chien-Min Wang, 7F, No. 40, Lane 468, Min An W Rd., Hsinchuang City, Taipei Hsien (TW)

( * ) Notice: Subject to any disclaimer, the term of this patent is extended or adjusted under 35 U.S.C. 154(b) by 0 days.

(21) Appl. No.: 10/614,171

(22) Filed: Jul. 8, 2003

(51) Int. Cl.[7] .............................................. B62M 11/14
(52) U.S. Cl. ...................................... 280/237; 280/260
(58) Field of Search ................................ 280/236–238, 280/255–260; 74/594.1–594.3; 384/517, 518, 545

(56) References Cited

U.S. PATENT DOCUMENTS

| | | | | |
|---|---|---|---|---|
| 4,089,540 A | * | 5/1978 | Liljequist | 280/259 |
| 5,312,125 A | * | 5/1994 | Tsao | 280/287 |
| 5,351,575 A | * | 10/1994 | Overby | 74/594.2 |
| 5,473,962 A | * | 12/1995 | Yamamoto | 74/594.1 |
| 5,597,242 A | * | 1/1997 | Beeler | 384/517 |
| 5,626,060 A | * | 5/1997 | Lin | 74/594.1 |
| 5,884,927 A | * | 3/1999 | Mahaney et al. | 280/237 |
| 5,924,801 A | * | 7/1999 | Chi | 384/545 |
| 6,003,889 A | * | 12/1999 | Shalom | 280/259 |
| 6,386,566 B1 | * | 5/2002 | Freeberg et al. | 280/237 |
| 6,390,487 B1 | * | 5/2002 | Yoo | 280/237 |
| 6,419,252 B1 | * | 7/2002 | Park et al. | 280/237 |

* cited by examiner

Primary Examiner—Lesley D. Morris
Assistant Examiner—L. Lum
(74) Attorney, Agent, or Firm—Rosenberg, Klein & Lee

(57) ABSTRACT

A bicycle having dual-purpose pedals is provided, wherein the structure of a main shaft tube of the bicycle is improved. The structure has a main shaft, a first spring, a gear bushing, a crank, a second spring, a washer and a fixing unit. The main shaft is received in the main shaft tube. The first spring is telescoped onto the main shaft. The washer, the second spring, and the gear bushing are received in order in a crank hole of the crank. The washer is fixed at the distal end of the main shaft by a screw. The fixing unit passes through and is fixed on the main shaft tube. The bicycle can be used as a conventional bicycle having a one-up-one-down, 360-degree, circular rotation pedaling function. The user can also change and control the two pedals to accomplish a same-up-same-down pedaling function for enhancing entertainment during use.

9 Claims, 9 Drawing Sheets

BICYCLE HAVING DUAL-PURPOSE PEDAL

FIELD OF THE INVENTION

The present invention relates to a bicycle having dual-purpose pedals and, more particularly, to a bicycle whose pedals having both a conventional 360-degree circular rotation pedaling function and a special same-up-same-down pedaling function.

BACKGROUND OF THE INVENTION

Bicycle use has evolved from transportation to leisure activity. Bicycles as a recreational activity do not require fuel, create no pollution, are conveniently portable, and good for the health and thus are very popular. The bicycle market is accordingly lucrative and the object of great interest, and research is continually conducted to improve the basic structure and function of bicycles. However, to date, research has only improved the speed, material, shape and comfort of bicycle but seldom accessed the function and amusement of bicycle. Therefore, existent bicycles have only a conventional 360-degree circular rotation pedaling function, which is monotonous and invariant, and a rider may become bored.

SUMMARY OF THE INVENTION

The primary object of the present invention is to provide a bicycle having dual-purpose pedals. Through the unique design of an axis and a crank of the pedal of the bicycle, the bicycle can be used as a conventional bicycle having a conventional one-up-one-down, 360-degree, circular oration pedaling function. The user can also change and control the two pedals to accomplish a special same-up-same-down pedaling function so that the bicycle may be ridden forwards like riding on a horse. The bicycle can thus be ridden in two ways, hence enhancing the entertainment thereof.

To achieve the above objects, the present invention provides a bicycle having dual-purpose pedals, in which the structure in a main shaft tube thereof is improved. The structure comprises a main shaft, a first spring, a gear bushing, a crank, a second spring, a washer and a fixing unit. The main shaft is received in the main shaft tube. Two ends of the main shaft are bearing portions. The outer diameter of one of the bearing portions diminishes and is horizontally extended to a fixing gear to form a gear portion. The outer diameter of the gear portion also diminishes and is horizontally extended to form a fixing portion. The first spring is telescoped onto the main shaft. One end of the first spring away from the gear portion is fixedly arranged on the main shaft. The other end thereof has a circular hole pressed onto the main shaft. The gear bushing is telescoped onto the fixing portion of the main shaft and correspondingly engages the gear portion. The outside of the gear bushing has two corresponding grooves. One end of the crank has a crank hole. A flange is disposed on the outside of the crank hole. Two corresponding projective bars are disposed in the crank hole. The projective bars are matched with the two grooves of the gear bushing. The second spring is received in the crank hole and abuts the gear busing. The washer abuts the flange of the crank hole and the second spring. A screw passes through the washer and is fixedly locked into the fixing portion of the main shaft to position the crank on the main shaft. A pin of the fixing unit passes through a through hole of the main shaft tube and is fixed in a position on the main shaft tube corresponding to the circular hole of the first spring.

When a user holds the left pedal steady with his left foot and moves the right pedal forward 180 degrees with his right foot, the engagement between the gear bushing and the gear portion of the main shaft is exploited to let the two pedals of the bicycle be at the same height and move in the same direction. The user then presses down the fixing unit to block the circular hole of the first spring so as to fix the first spring on the main shaft tube. At this time, the user can step on the two pedals to drive the bicycle to advance in a same-up-same-down way. On the other hand, if the user moves the right pedal forward 180 degrees with his right foot and releases the fixing unit, he can restores the two pedals to the conventional, 360-degree, circular rotation, one-up-one-down pedaling function.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
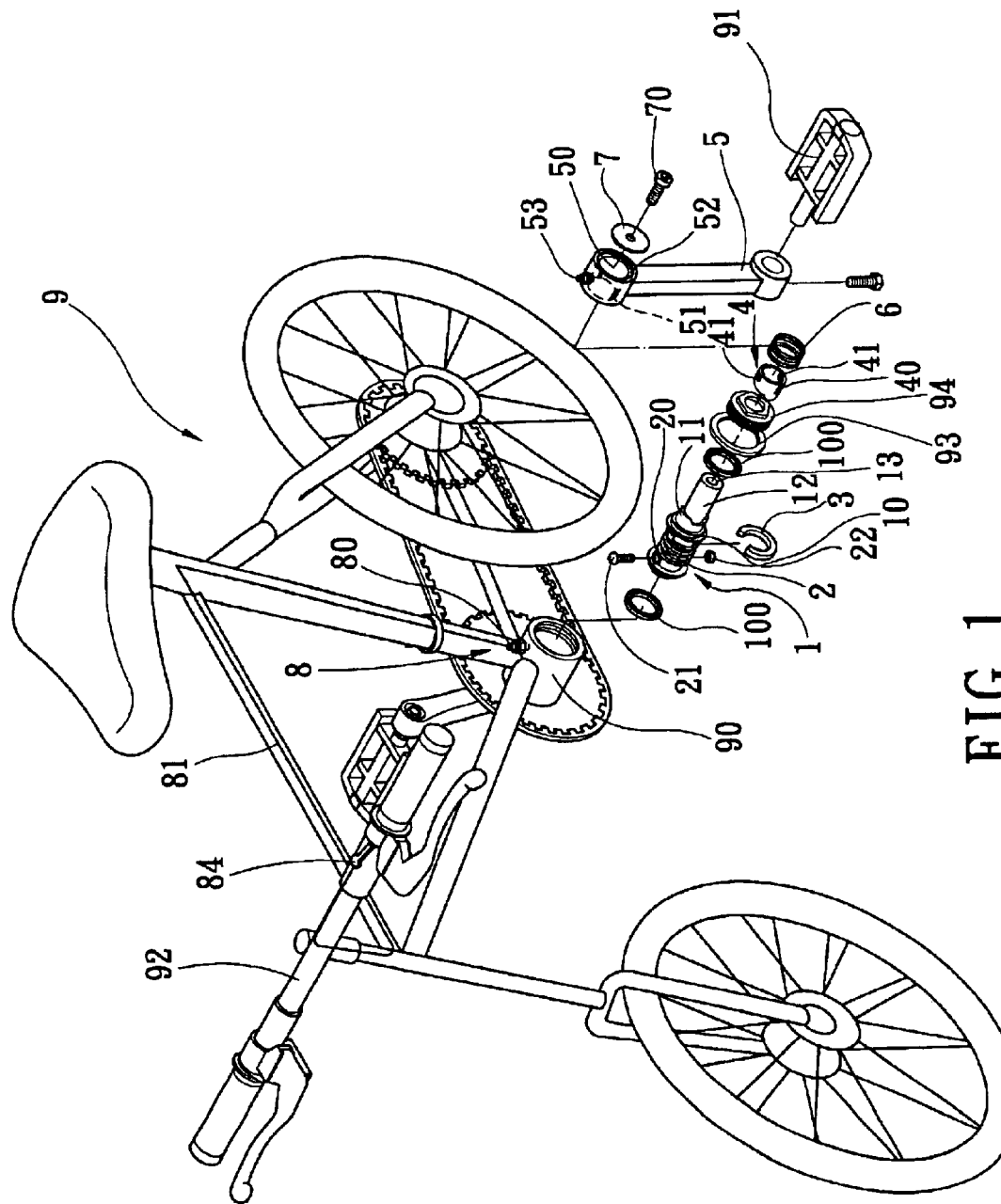
FIG. 1 is a partly exploded perspective view of the present invention.
Figure 2:
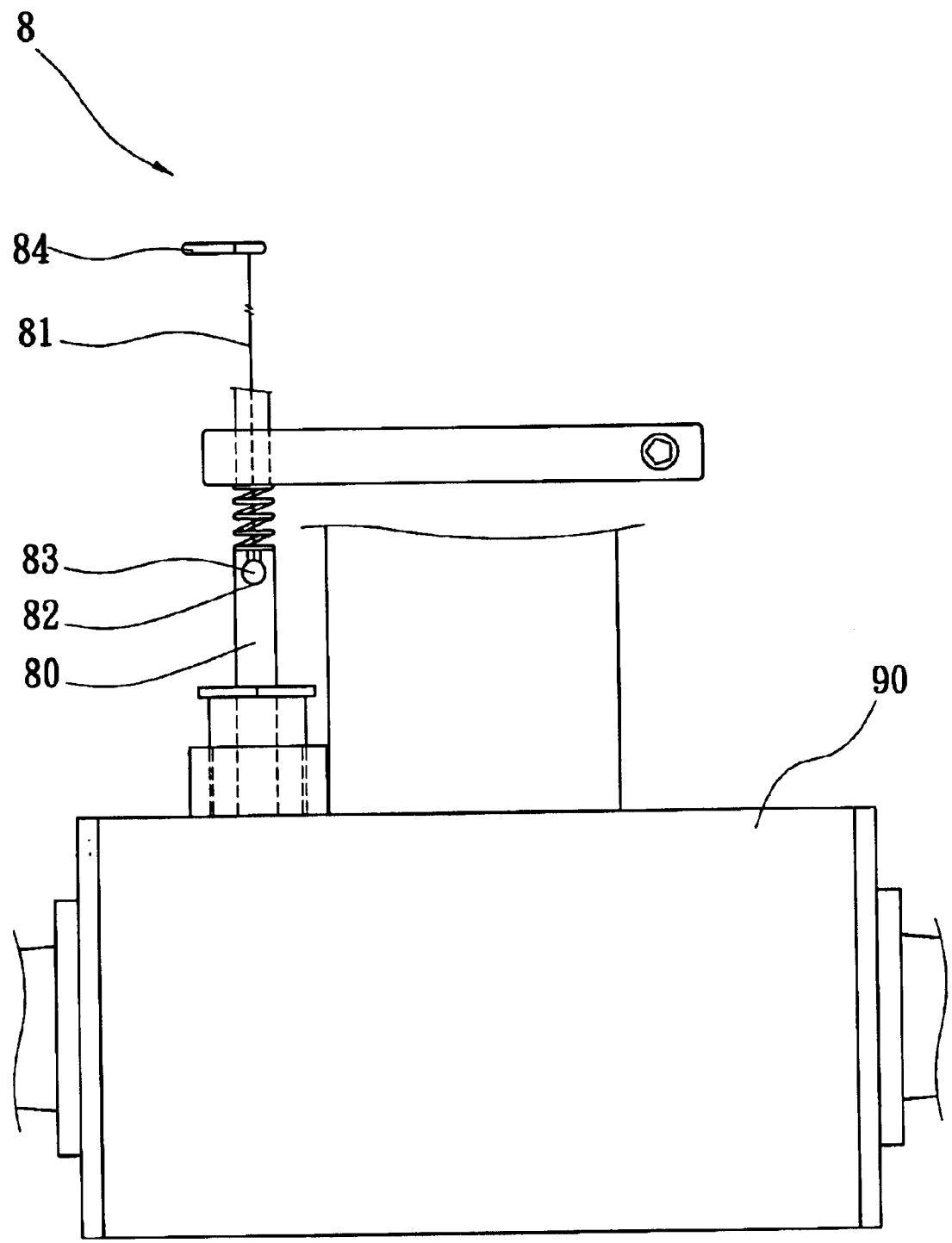
FIG. 2 is a partly enlarged view of FIG. 1.
Figure 3:
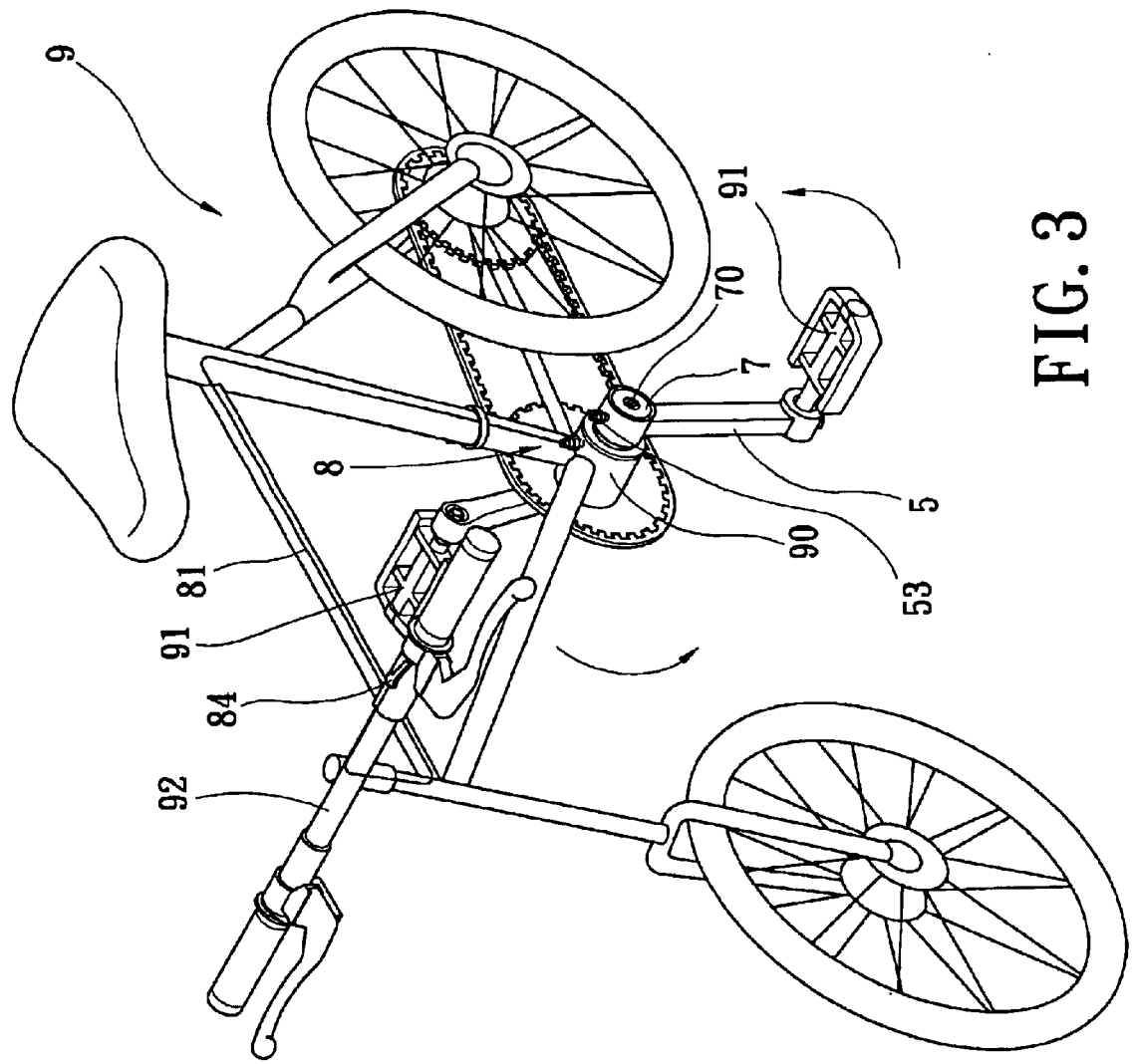
FIG. 3 is a perspective assembly view of the present invention.

As shown in FIGS. 1 to 3, the present invention provides a bicycle 9 having dual-purpose pedals. The bicycle 9 comprises a main shaft 1, a first spring 2, a gear bushing 4, a crank 5, a second spring 6, a washer 7 and a fixing unit 8.

The main shaft 1 is received in a main shaft tube 90 of the bicycle 9. Two ends of the main shaft 1 are bearing portions 10. The outer diameter of one of the bearing portions 10 diminishes and is horizontally extended to a fixing gear to form a gear portion 11. The gear portion 11 is a two-toothed ratchet. The outer diameter of the gear portion 11 also diminishes and is horizontally extended to form a fixing portion 12. A screw hole 13 is formed on an end face of the fixing portion 12. Through the gear portion 11 and the fixing portion 12, one end of the main shaft 1 has a diminishing three-stage outer diameter.

The first spring 2 is telescoped onto the main shaft 1. Two ends of the first spring 2 have circular holes 20. The circular hole 20 of the first spring 2 away from the gear portion 11 is passed through by a screw 21 and matched with a screw nut 22 to be fixedly locked on the main shaft 1. The other circular hole 20 is pressed onto the main shaft 1. A C-shaped bushing 3 is telescoped on the outer periphery of the circular hole 20. The thickness of the C-shaped bushing 3 is greater than that of the first spring 2. Additionally, as shown in FIG. 1, each end of the shaft tube 90 is screwed to an outer thread at the outer periphery of a side cover 94 through a fastening ring 93 to position the side cover 94.

One end of the gear bushing 4 has a two-toothed ratchet the same as the gear portion 11 of the main shaft 1. The gear bushing 4 is telescoped onto the fixing portion 12 of the main shaft 1 and correspondingly engages the gear portion 11. The outside of the gear bushing 4 has two corresponding grooves 40 and two corresponding through holes 41. The grooves 40 are bar-shaped, and are extended to the edge of the other end opposite the two-toothed ratchet.

One end of the crank 5 is pivotally connected with a pedal 91 of the bicycle 9. The other end of the crank 5 has a crank hole 50. A flange 52 is disposed at the outside of the crank hole 50. Two corresponding projective bars 51 are disposed in the crank hole 50. The projective bars 51 are bar-shaped, and are extended to the edge opposite the gear bushing 4. The projective bars 51 are matched with the two grooves 40 of the gear bushing 4. A movable pin 5 passes through and is fixed in the crank hole 50. The movable pin 53 can be pressed by a rider to be inserted in the through hole 41 of the gear bushing 4 for enhancing the stability of the gear bushing 4.

The second spring 6 is received in the crank hole 50 and abuts the gear busing 4.

The washer 7 abuts the flange 52 of the crank hole 50 and the second spring 6. A screw 70 passes through the washer 7 and is fixedly locked into the screw hole 13 of the fixing portion 12 of the main shaft 1 to let the flange 52 be blocked by the washer 7 and thus position the crank 5 at the outside of the main shaft 1. The inner side of the crank hole 50 abuts the drop between the bearing portions 10 and the gear portion 11 of the main shaft 1 to fix the crank 5.

Reference is simultaneously made to FIG. 2 and FIG. 1. The fixing unit 8 is composed of a pin 80 and a steel rope 81. The pin 80 passes through the main shaft tube 90 and is fixed in a position on the main shaft tube corresponding to the circular hole 20 of the first spring 2. A small groove is formed at the top face of the pin 80. The bottom end of the small groove is extended to form a cavity 82. A block body 83 is fixedly provided at a distal end of the steel rope 81. The block body 83 is inserted and retained in the cavity 82 to connect and fix the pin 80 and the steel rope 81 together. The other end of the steel rope 81 is connected to an adjustment rod 84 and fixedly arranged on a handlebar 92 of the bicycle 9.

For clarity, the above arrangement is described in greater detail. The adjustment rod 84 of the fixing unit 8 is arranged on the handlebar 92 of the bicycle 9. The steel rope 81 passes through an outer tube with no reference numeral to form a steering wire set similar to a conventional braking wire. The steering wire set is fixed on the body supporter of the bicycle 9 by a clamping ring. The steel rope 81 is connected between the adjustment rod 84 and the block body 83. The block body 83 is embedded in the cavity 82 at one end of the pin 80. An elastic part is arranged between the pin 80 and the clamping ring to allow the pin 80 to protrude elastically downwards.

Figure 4:
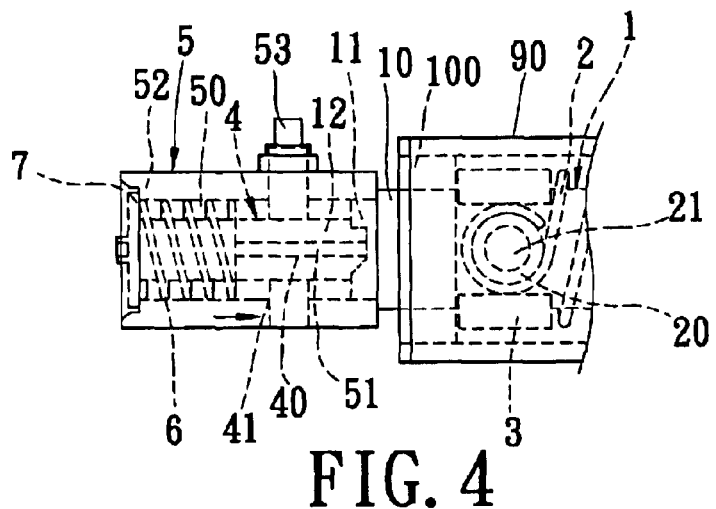
FIG. 4 is a perspective back view showing the action of the crank and the axis of the present invention.
Figure 5:
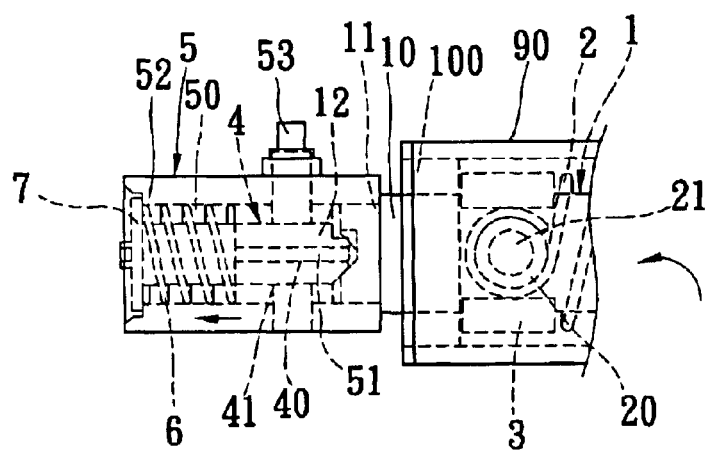
FIG. 5 is an action diagram according to FIG. 4 of the present invention.
Figure 6:
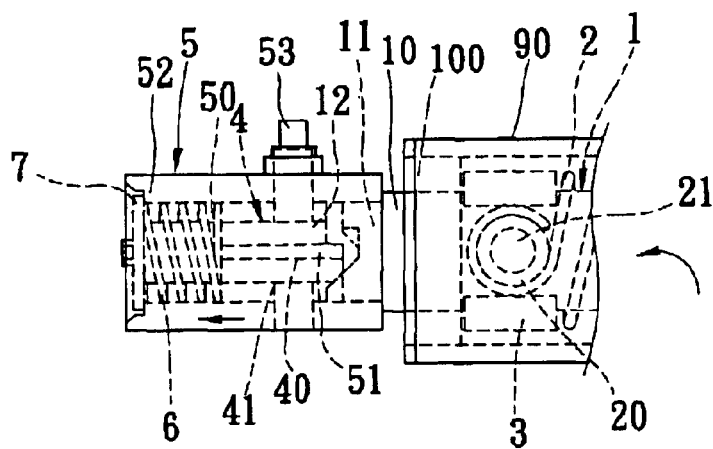
FIG. 6 is an action diagram according to FIG. 5 of the present invention.
Figure 7:
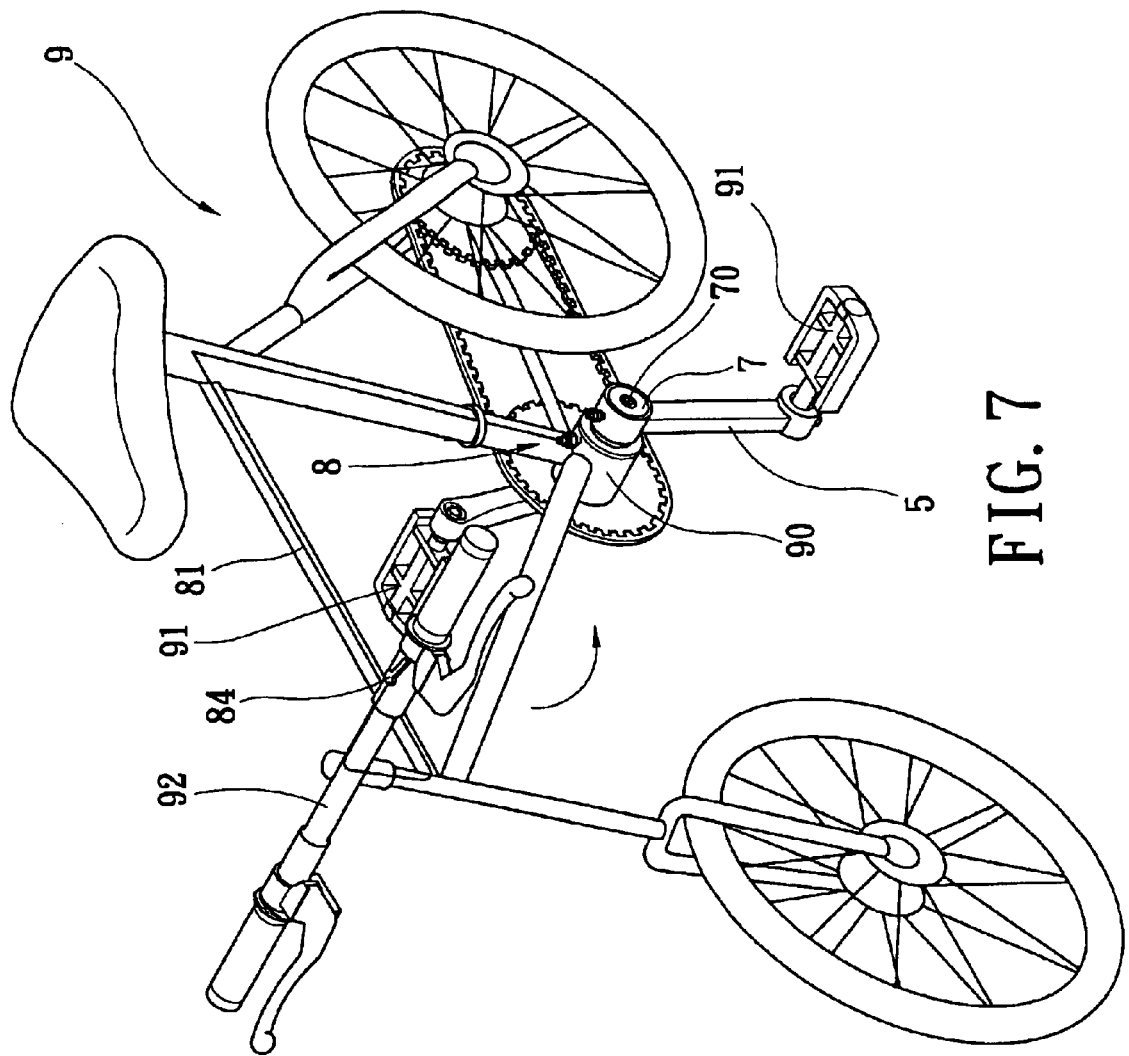
FIG. 7 is an action diagram showing an in-use state of the present invention.
Figure 8:
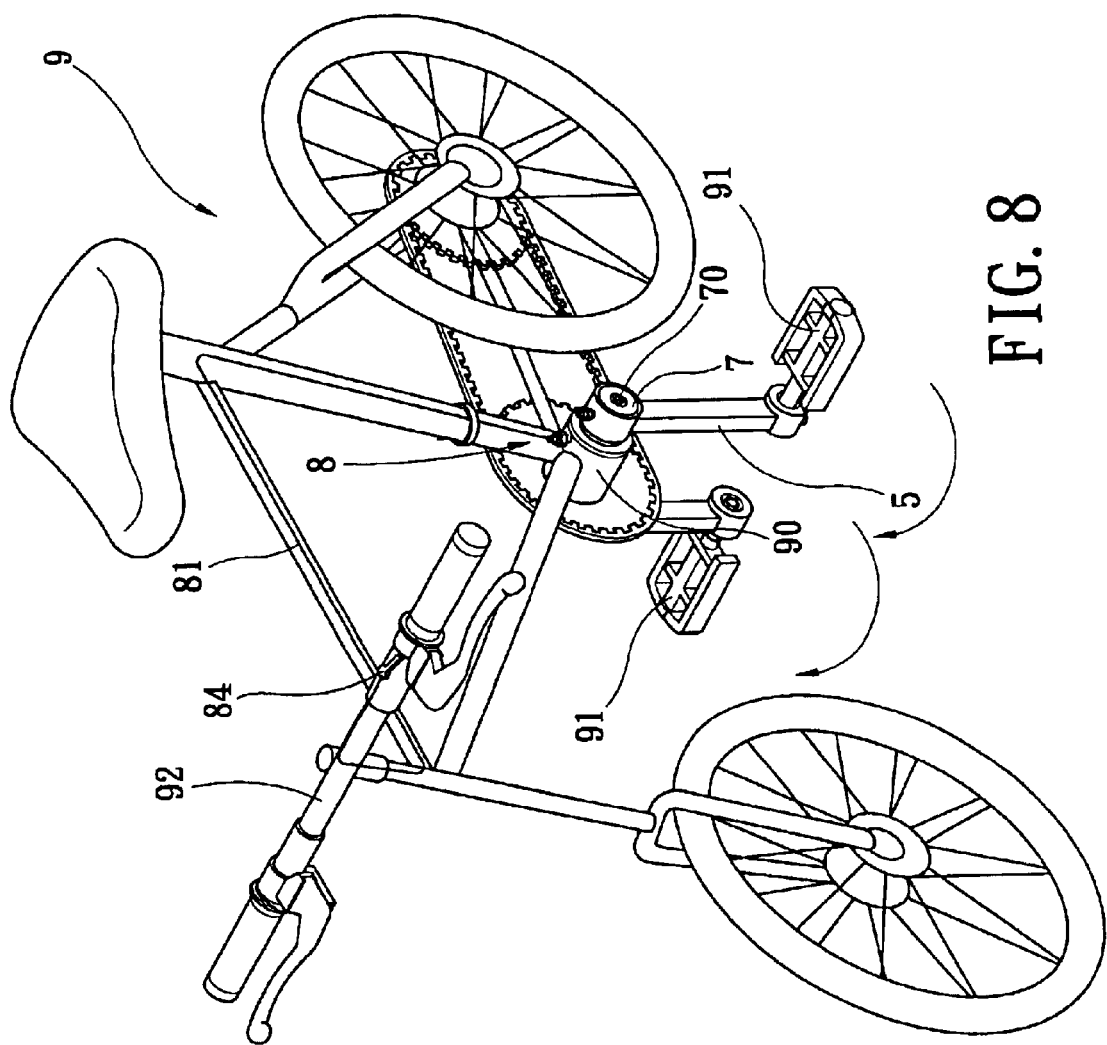
FIG. 8 is an action diagram showing another in-use state of the present invention.
Figure 9:
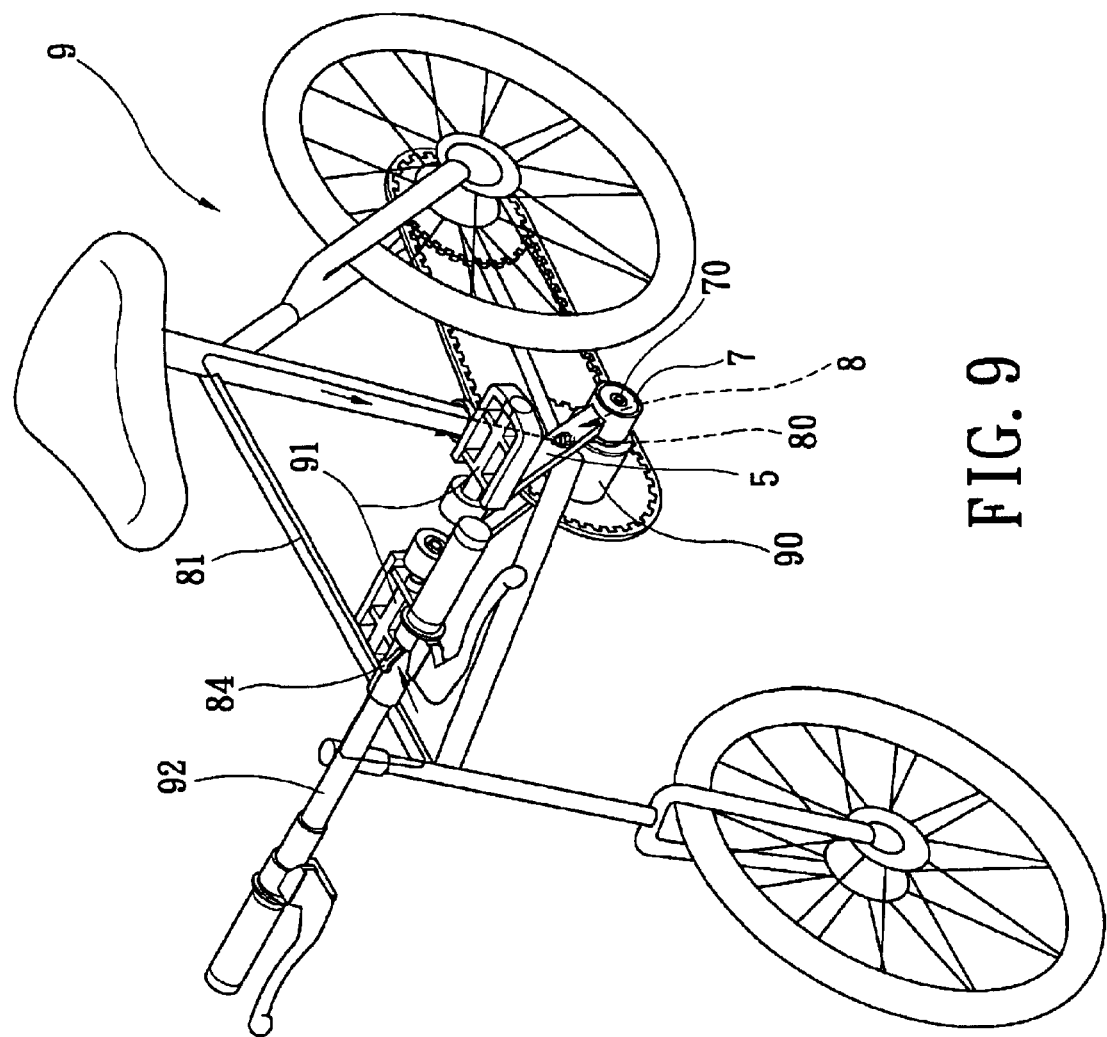
FIG. 9 is an action diagram showing yet another in-use state of the present invention.
Figure 10:
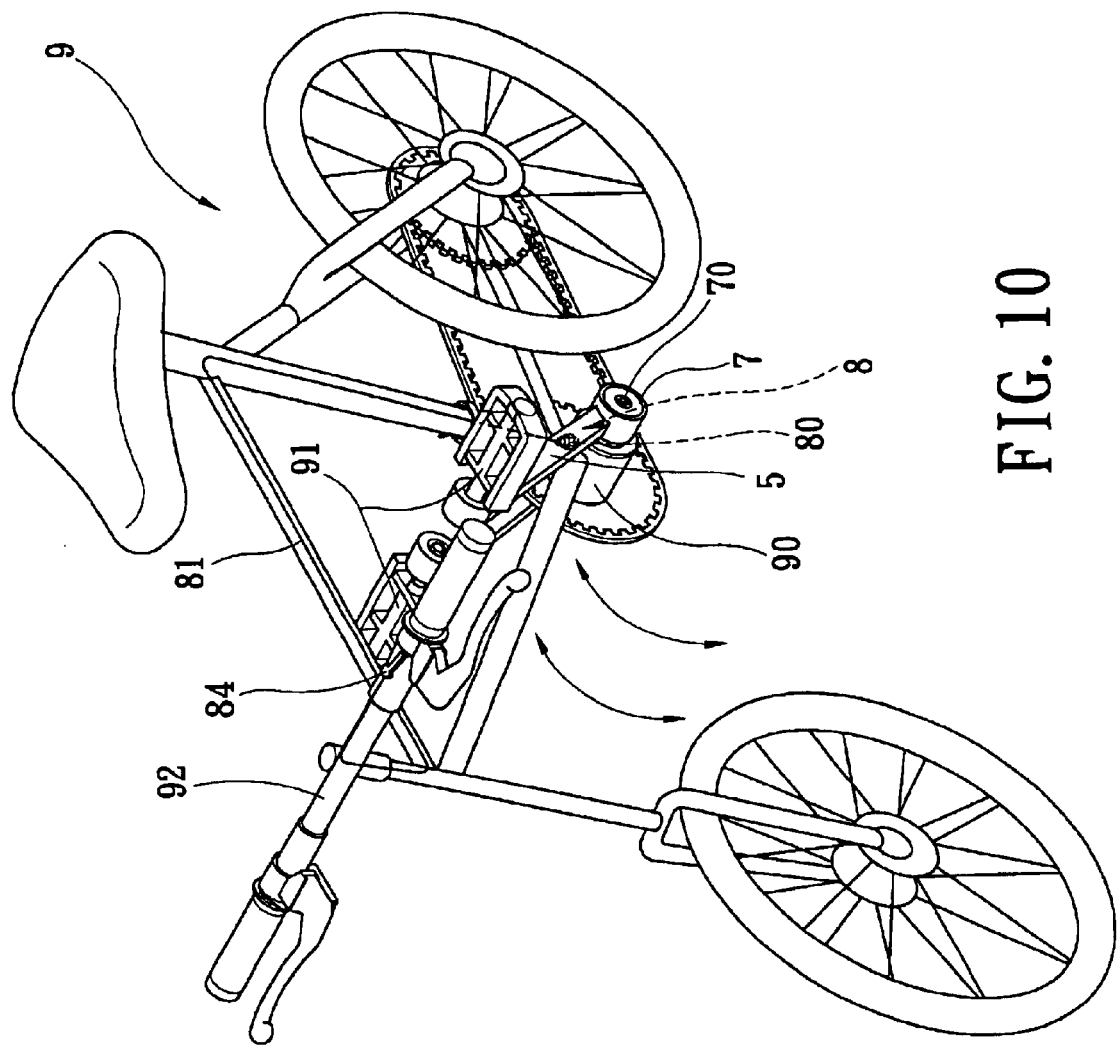
FIG. 10 is an action diagram showing yet another in-use state of the present invention.
Figure 11:
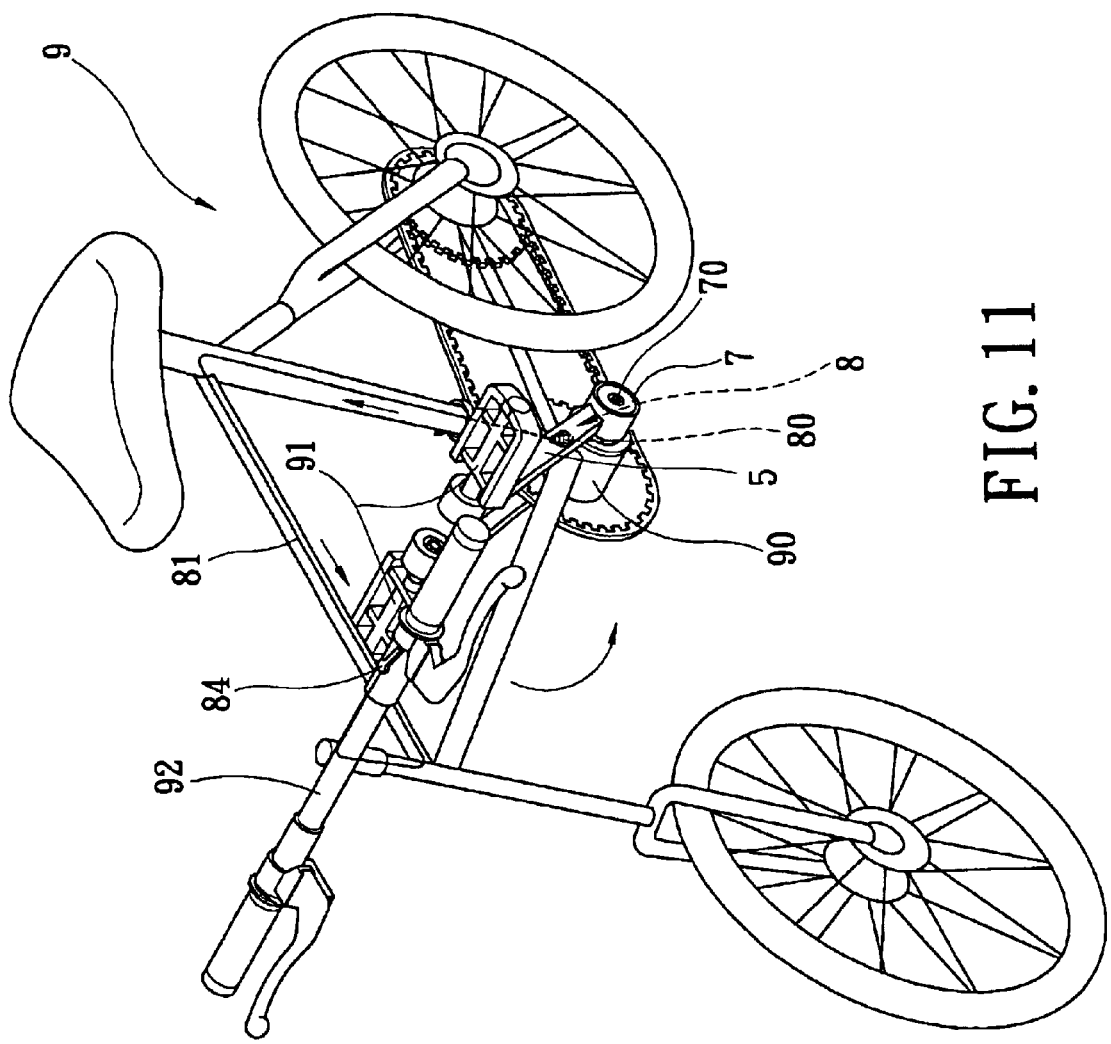
FIG. 11 is an action diagram showing yet another in-use state of the present invention.

As shown in FIGS. 3 and 4, the ratchet of the gear busing 4 is engaged with and abuts the gear portion 11 of the main shaft 1 through the elasticity of the second spring 6, thereby allowing the main shaft 1 to function in a conventional manner. That is, the pedals 91 can be arranged opposite each other in a line to be pedaled forwards in a 360-degree circular rotation to move the bicycle 9 forward.

As shown in FIGS. 5 to 10, when a rider holds the left pedal steady in the lowest position with his left foot and moves the right pedal 180 degrees forward with his right foot, because the two grooves 40 at the outside of the gear bushing 4 are matched with the projective bars 51 in the crank hole 50, the left pedal 91 held steady by the left foot generates a counteractive force. This counteractive force allows the two grooves 40 at the outside of the gear bushing 4 to recede along the two projective bars 51 in the crank hole 50 and simultaneously compress the second spring 6 to move in the direction of the left pedal 91. After the right pedal 91 rotates 180 degrees, the two-toothed ratchet of the gear bushing 4 tightly engages the two-toothed ratchet of the main shaft 1. At this time, the two pedals 91 are at the same height and moving in the same direction. Meanwhile, once the two pedals 91 are hooked upwards and the adjustment rod 84 on the handlebar 92 is controlled to compress the steel rope 81 and insert the pin 80 into the circular hole 20 of the first spring 2 arranged at the outer periphery of the main shaft 1. Because the C-shaped bushing 3 thicker than the first spring 2 is telescoped on the outer periphery of the circular hole 20 of the first spring 2, the pin 80 can be easily inserted into the circular hole 20 so that the first spring 20 can be held up on the main shaft tube 90 by the pin 80. At this time, the main shaft 1 is already confined by the first spring 2, and can only swing within an interval. When the rider simultaneously steps downwards on the two pedals 91 with his two feet, the two pedals 91 are affected by the restoring force of the first spring 2 to spring upwards and be restored to the upper position. Therefore, the rider can simultaneously and continually step downwards on the two pedals 91 with his two feet within this interval to move the bicycle 9 forwards in a motion like riding a horse.

Reference is simultaneously made to FIGS. 3–6 and 11. When the rider wants to restore the two pedals 91 to the original conventional pedaling function, he only needs to control the adjustment rod 84 on the handlebar 92 so that the steel rope 81 pulls up the pin 80. The main shaft 1 is no longer confined by the pin 80. At this time, the two pedals 91 are in the upper position. The rider then hooks the left pedal 91 with his left foot to stop it from rotating, and simultaneously move the right pedal 91 180 degrees forward with his right foot to let the gear bushing 4 in the crank hole 50 be compressed by the gear portion 11 and recede. After the rider moves the right pedal 91 180 degrees forward with his right foot, the two gears immediately allow the two pedals 91 be opposite each other in a line. That is, the bicycle 9 is restored to the conventional pedaling mode.

When the bicycle 9 is in the conventional riding mode, the two pedals 91 can be freely pedaled backwards without moving forwards. Because the elastic force of the second spring 6 is greater than the low friction of the two pedals 91 turning without moving forwards, when the rider does not hold the left pedal 91 steady with his left foot (i.e., the left pedal 91 does not rotate), the gear bushing 4 in the crank hole 50 is still impeded and pushed by the second spring 6 to engage the gear portion 11 of the main shaft 1 so that the crank 5 can continually turn backwards without moving forwards along with the pedals 91. Therefore, the bicycle having dual-purpose pedals of the present invention can be ridden like a conventional bicycle.

To sum up, the bicycle having dual-purpose pedals of the present invention can be used as a conventional bicycle having a one-up-one-down, 360-degree, circular rotation pedaling function. The user can also change and control the two pedals to accomplish a same-up-same-down pedaling function. In this way, the body motion of the rider increases. Therefore, the design of the present invention can let the bicycle be ridden in two ways to enhance greatly the fun of riding.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A bicycle having dual-purpose pedals, wherein a structure of a main shaft tube of said bicycle is improved, said structure comprising:

a main shaft received in said main shaft tube, two ends of said main shaft having bearing portions, an outer diameter of one of said bearing portions diminishing and being horizontally extended to a fixing gear to form a gear portion, the outer diameter of said gear portion also diminishing and being horizontally extended to form a fixing portion;

a first spring telescoped onto said main shaft, one end of said first spring being fixedly arranged on said main shaft, another end of said first spring having a circular hole pressed onto said main shaft;

a gear bushing telescoped onto said fixing portion of said main shaft and correspondingly engaging said gear portion, two corresponding grooves being provided at an outside of said gear bushing;

a crank, wherein one end thereof is pivotally connected with a pedal of said bicycle and another thereof end has a crank hole therein, a flange being provided outside said crank hole, two corresponding projective bars being arranged in said crank hole, and said projective bars being matched in said two grooves of said gear bushing;

a second spring received in said crank hole and abutting said gear bushing;

a washer abutting said flange of said crank hole and said second spring, a screw passing through said washer and being fixedly locked in said fixing portion of said main shaft to position said crank on said main shaft; and a fixing unit passing through said main shaft tube and fixed at a position on said main shaft tube corresponding to said circular hole of said first spring.

2. The bicycle having dual-purpose pedals as claimed in claim 1, wherein said gear portion and said gear bushing both are two-toothed ratchets.

3. The bicycle having dual-purpose pedals as claimed in claim 1, wherein a circular hole is disposed at one end of said first spring away from said gear portion so that a screw can pass therethrough and match a screw nut for fixing said first spring on said main shaft.

4. The bicycle having dual-purpose pedals as claimed in claim 1, wherein a C-shaped bushing is telescoped onto said circular hole of said first spring.

5. The bicycle having dual-purpose pedals as claimed in claim 4, wherein a thickness of said C-shaped bushing is greater than that of said first spring.

6. The bicycle having dual-purpose pedals as claimed in claim 1, wherein said fixing unit is composed of a pin and a steel rope, said pin passes through said main shaft tube and is fixed at a position corresponding to said circular hole of said first spring on said main shaft tube, one end of said steel rope is fixedly disposed on said pin, and another end thereof is connected with an adjustment rod and fixedly disposed on a handlebar of said bicycle.

7. The bicycle having dual-purpose pedals as claimed in claim 6, wherein a small groove is provided in a top face of said pin, a bottom end of said small groove is extended to form a cavity, a block body is fixedly disposed at a distal end of said steel rope, and said block body is inserted and retained in said cavity to connect and fix said pin and said steel rope together.

8. The bicycle having dual-purpose pedals as claimed in claim 1, wherein said two grooves of said gear bushing are bar-shaped, and are extended to the edge of said gear busing, said two projective bars of said crank hole are also bar-shaped and are extended to the distal end of said gear bushing, and said two bars are matched with and received in said two grooves to allow said gear bushing to slide in said crank hole.

9. The bicycle having dual-purpose pedals as claimed in claim 1, wherein said gear bushing has two corresponding through holes, a movable pin passes therethrough and is fixed in said crank hole, and said movable pin can be inserted in said through hole to enhance the stability of said gear bushing.

* * * * *